Sept. 16, 1941. F. E. OVERSON 2,255,806
BROODER FOR HOGS AND THE LIKE
Filed Dec. 15, 1938 2 Sheets-Sheet 1
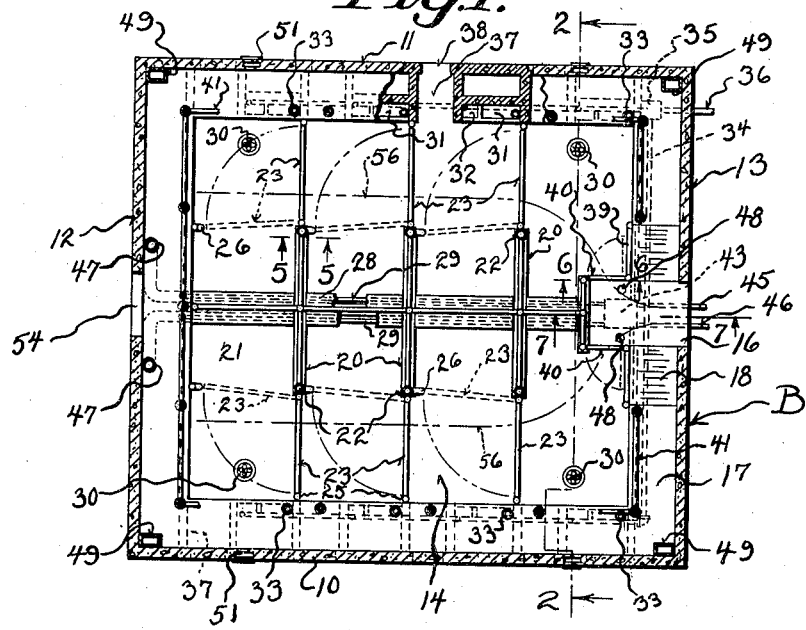
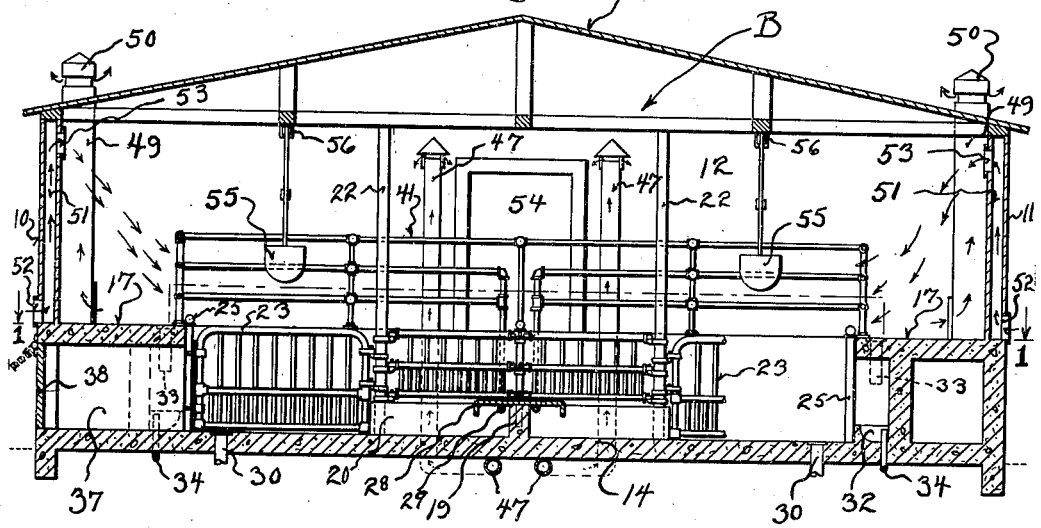
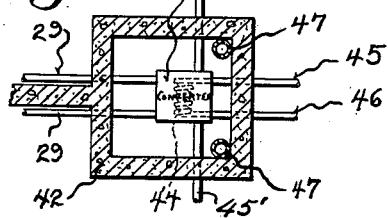
Inventor
F. E. Overson
By
Attorneys Sept. 16, 1941.  F. E. OVERSON  2,255,806
BROODER FOR HOGS AND THE LIKE
Filed Dec. 15, 1938  2 Sheets-Sheet 2

Inventor
F. E. Overson
By
Attorneys

Patented Sept. 16, 1941

2,255,806

UNITED STATES PATENT OFFICE 2,255,806

BROODER FOR HOGS AND THE LIKE

Frank E. Overson, Racine, Wis.

Application December 15, 1938, Serial No. 245,861

3 Claims. (Cl. 119—16)

This invention appertains to animal barns, and more particularly to a novel brooder for hogs and the like.

One of the primary objects of my invention is to provide a centrally disposed heated hover for young or newly born pigs, so that the pigs will not crowd the sow for warmth, which frequently results in injury or death to the pigs caused by the sows rolling upon them.

Another salient object of my invention is to provide an animal barn embodying a plurality of pens arranged on opposite sides of a heated hover, which extends longitudinally through and centrally of the building with a raised walk extending around the building, the walk facilitating the feeding of the pigs and preventing the young pigs from approaching too close to the cold outer walls of the building.

A further important object of my invention is to provide novel means for insuring the proper heating and ventilating of the building, said means permitting the tempering of all cold air entering the building.

A still further object of my invention is to provide a novel arrangement of gates for the pens, which can be so manipulated as to confine the sow and her litter in a space adjacent the hover where the bedding is, so that the remaining part of the pen where the droppings occur can be conveniently cleaned.

With these and other objects in view, the invention consists in the novel construction, arrangement, and formation of parts, as will be hereinafter more specifically described, claimed, and illustrated in the accompanying drawings, in which drawings:

Figure 1 is a horizontal section through the barn constructed in accordance with my invention, the section being taken substantially on the line 1—1 of Figure 2, looking in the direction of the arrows.

Figure 2 is a transverse, sectional view through the barn, taken on the line 2—2 of Figure 1, looking in the direction of the arrows, the view being taken on a larger scale than Figure 1.

Figure 3 is a fragmentary, horizontal, sectional view through the convertor pit, which is arranged at one end of the barn.

Figure 4:
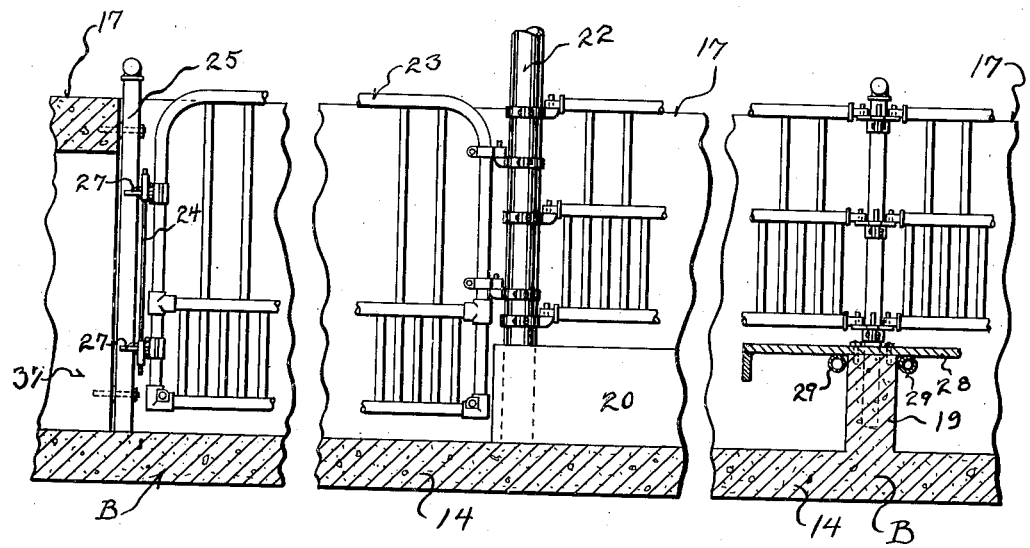
Figure 4 is a fragmentary, detail, vertical sectional view through a portion of the building, illustrating the novel arrangement of the gates and hover for the pen, the view being an enlargement of a portion of Figure 2.
Figure 5:
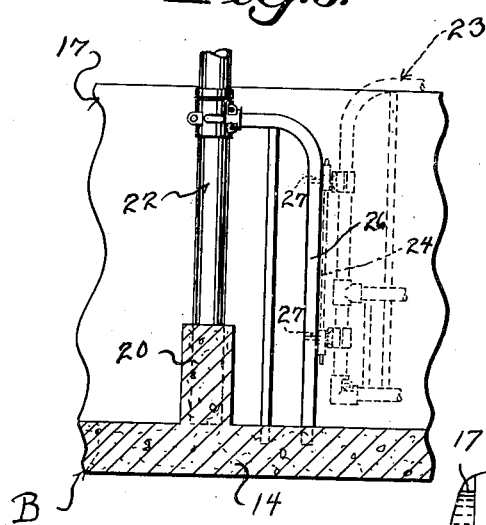
Figure 5 is a fragmentary, detail, vertical, sectional view through the barn, taken on the line 5—5 of Figure 1, looking in the direction of the arrows.
Figure 6:
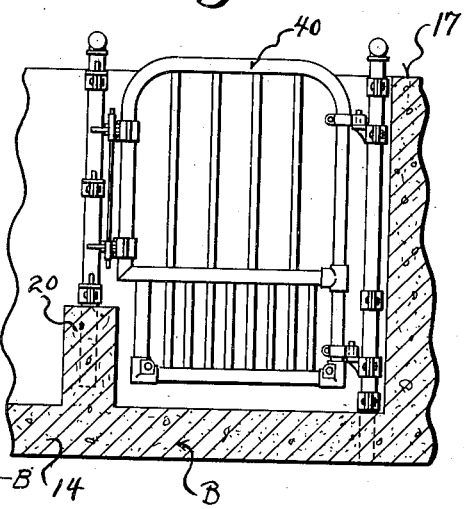
Figure 6 is an enlarged, detail, vertical, sectional view through the barn, taken substantially on the line 6—6 of Figure 1, looking in the direction of the arrows.
Figure 7:
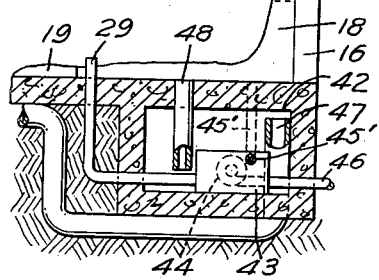
Figure 7 is an enlarged, fragmentary, vertical, sectional view taken on the line 7—7 of Figure 1, further illustrating the convertor pit and associate parts.

Referring to the drawings in detail, wherein similar reference characters designate corresponding parts throughout the several views, the letter B generally indicates my novel brooder barn, and, as illustrated, the same includes longitudinally extending side walls 10 and 11 and end walls 12 and 13. These walls are preferably formed from concrete and are placed upon a suitable concrete foundation, and a relatively thick concrete floor 14 is provided. Any desired type of roof 15 can be provided for the building. The end wall 13 is provided with an entrance doorway 16, and around the side and end walls of the building a raised concrete walk 17 is formed. The raised walk 17 extends from opposite sides of the doorway 16, and suitable inclined runways or ramps 18 lead from the floor 14 to the walks 17.

Extending longitudinally of the building at the central portion thereof is a low partition or curbing 19. This central partition 19 extends from the walk 17 at the end wall 12 toward the entrance door 16, but, as shown, the partition terminates short of the entrance door and the ramps 18. Extending laterally from the opposite sides of the central partition 19 is a plurality of equidistantly spaced low partitions or curbs 20. The curbs 19 and 20 define a plurality of pens 21, but it is to be noted that the transverse curbs 20 terminate short of the side walls 10 and 11 and the raised walk, for a purpose which will now be set forth.

The outer ends of the curbs 20 carry columns 22 which can be utilized for supporting roof rafters, and each of these columns hingedly supports a gate 23. The gates 23 are adapted to normally set in longitudinal alinement with the curbs 20, and, hence, the same can be latched by suitable catches 24 to gate posts 25. These gate posts 25 can be embedded in the concrete floor 14 and secured to the raised walk 17 in any preferred manner. The gates 23 can also be swung transversely across the pens at right angles to the curbs 20, and the gates can be latched in that position to gate posts 26 by means of suitable keepers 27. Obviously, when the gates 23 are swung across the pens, the active size of the pens is decreased, and the pigs will be confined in the inner portions of the pens adjacent the central curb or partition 19. The curb 19 supports a hood 28 preferably formed from wood boards, and the lower faces of the hood on opposite sides of the curb carry hot water return pipes 29. Thus, the curb 19, the hood 28, and the pipes 29 constitute a hover for young pigs, and the young pigs can be kept warm by the hover. As the floor 14 is of concrete, the same can be easily kept clean, and the floor can be flushed with water when so desired. Thus, the floor is provided at desired points with water drains 30, which can lead to suitable sewers.

Each pen 21 is provided with a feed trough 31 and a water trough 32. These troughs are preferably moulded in the walk 17 at the base thereof, and the feed troughs have leading into the same relatively large vertical pipes 33. These pipes open out through the top of the walk 17, and consequently attendants can pour the feed down the pipes 33 from the walk into the troughs.

It is preferred to provide means for automatically maintaining a constant level of water in the water troughs 32, and, hence, all the water troughs are connected with feed water pipes 34. These pipes 34 lead to a common supply tank 35, and this tank is constantly replenished with water from a water feed pipe 36. The flow of water into the tank is governed by a float valve (not shown).

Each pen also has communicating therewith a runway 37 which leads under the walk to a small exit door 38. On the outside of the building, open-air yards are provided for the pigs, and consequently during the daytime the doors 38 can be raised so that the pigs can go out of the barn into the yards for exercise. During farrowing the doors 38 are kept closed.

As the walks 17 are placed around the pens, the young pigs are kept away from the outer walls of the building, except at the doors 38 and, hence, the young pigs will not be chilled by the outer walls during cold seasons of the year.

A suitable fence 39 is disposed at the end of the building adjacent the doorway 16 and the ramps 18, so that the animals will be kept away from the ramps and the doorway. The fence 39 is provided with suitable gates 40, whereby attendants can readily gain access to the pens.

The walk 17 is provided with a protecting railing 41, and the same is constructed from pipes. The railing extends from the ramps 18 entirely around the walk 17, and the two lower stretches of the horizontal pipes of the railing 41 carry the hot water for heating the building. The hot water for heating the building can be derived from any suitable source or heating unit, but in the present instance a concrete pit 42 is placed under the floor 14 adjacent the doorway 16, and this pit has placed therein a so-called convertor tank 43. A coil or the like 44 is arranged within the convertor tank, and feed and return pipes 45 and 46 are provided for the coil 44, so that live steam can be circulated therethrough. The tank 43 is filled with water, which is heated by the steam coil, and the tank 43 has leading therefrom hot water feed pipes 45', which lead up to and communicate with the inner ends of the horizontal stretches of the fence 41 at the ramps 18. These pipes of the railings have communicating therewith at the rear end of the building the return hot water pipes 29, which, as stated, are placed under the hover 28. Obviously, the hot water from the tank 43 will rise up through the pipes 45' to the horizontal pipes of the railing, and as the water cools the same will drop down to the return pipes 29 back into the tank.

I prefer to provide a circulation of air through the pit, so that the pit will be kept dry. Consequently, relatively large pipes (tile) 47 communicate with the pit, and these pipes are placed under the floor 14 of the building adjacent the central partition or curb 19. The pipes 47 lead toward the rear end of the building and open out through the walk 17. Air openings 48 are also provided for the pit. By this arrangement, air is circulated through the pit, and the air flowing through the pipes 47 will heat the floor 14 adjacent the hover.

Vent pipes 49 are arranged at the corners of the building and extend through the roof and are covered by suitable cowls 50. Thus, foul air is taken away from the building. Fresh air channels 51 are formed at spaced points in the building, and the lower ends of the channels open out through the outer sides of the building to form fresh air intakes 52. The upper ends of the channels 51 open into the building through inlets 53, and these inlets 53 are arranged adjacent the roof of the building. The formation of the channels is such as to prevent direct drafts in the building, and cold air entering through the inlets 53 will drop down toward the floor and flow past the railing 41. The hot water pipes of the railing will heat and temper the incoming air.

If desired, the rear end wall 12 of the building can also be provided with an entrance door 54, and this door can lead directly onto the walk 17.

Elevated litter carriers 55 can also be provided for the building, and these carriers can be mounted on tracks 56 which lead out of the door 16. Obviously, when the gates 23 are swung across the pens, the animals will be confined adjacent the hover, and, thus, the pens adjacent the walks can be quickly and easily cleaned without disturbing the animals.

Changes in details can be made without departing from the spirit or the scope of my invention, but what I claim as new is:

1. A barn for brooding pigs, comprising a plurality of transversely extending pens, a centrally disposed heated hover for young pigs extending longitudinally through the building common to all of the pens, and a raised walk extending entirely around the inside of the building against the outer walls and around the outer ends of the pens for facilitating the feeding of the pigs having a portion contiguous with the floor of the barn for keeping young pigs away from the cold outer walls of the building and adjacent the heated hover.

2. A barn for brooding pigs comprising, side and end walls, a floor and a roof, a plurality of transversely extending pens in the building, a longitudinally extending heated hover common to all of the pens, a raised walk extending entirely around the inside of the building against the outer walls and above the pens for facilitating the feeding of the pigs having a portion contiguous with the floor of the barn forming the outer ends of the pens for spacing the pigs from the cold outer walls of the building, feed and water troughs for each of the pens disposed under the walk, means for placing feed in the troughs from the top face of the walk, and means for heating the building.

3. A barn for brooding pigs comprising, a plurality of transversely extending brooding pens, a heated hover extending longitudinally of the building and common to all of the pens, a raised walk arranged in the building around the pens, a railing for the walk including hot water heating pipes, fresh air inlets for the building communicating with the building adjacent the roof of the building whereby said air will drop upon coming into the building and flow past the railing.

FRANK E. OVERSON.